(12) United States Patent
Nakamura

(10) Patent No.: US 8,456,118 B2
(45) Date of Patent: Jun. 4, 2013

(54) CIRCUIT AND METHOD FOR DRIVING MOTOR

(75) Inventor: Masahiro Nakamura, Kyoto (JP)

(73) Assignee: Rohm Co., Ltd. (JP)

( * ) Notice: Subject to any disclaimer, the term of this patent is extended or adjusted under 35 U.S.C. 154(b) by 345 days.

(21) Appl. No.: 12/795,842

(22) Filed: Jun. 8, 2010

(65) Prior Publication Data

US 2010/0308760 A1     Dec. 9, 2010

(30) Foreign Application Priority Data

Jun. 8, 2009 (JP) ................... 2009-137186
Mar. 25, 2010 (JP) ................... 2010-070798

(51) Int. Cl.
*H02K 29/08* (2006.01)

(52) U.S. Cl.
USPC ............ 318/400.38; 318/400.01; 318/400.39; 318/652

(58) Field of Classification Search
USPC .................. 318/400.01, 400.32, 400.38, 721, 318/432, 701, 400.39, 400.4, 652, 799
See application file for complete search history.

(56) References Cited

U.S. PATENT DOCUMENTS

| | | | | |
|---|---|---|---|---|
| 4,639,798 A | * | 1/1987 | Harrison et al. | 360/73.03 |
| 4,686,437 A | * | 8/1987 | Langley et al. | 318/400.01 |
| 8,203,296 B2 | * | 6/2012 | Hristov et al. | 318/400.19 |

* cited by examiner

*Primary Examiner* — Antony M Paul
(74) *Attorney, Agent, or Firm* — Cantor Colburn LLP

(57) ABSTRACT

A cycle counter generates a cycle signal which indicates, in the form of a digital value, the cycle of Hall signals H+ and H− that indicate the position of a rotor of a motor to be driven. An up/down counter repeatedly alternates between counting "up" and counting "down" upon detecting phase transitions that occur in the Hall signals, and generates a digital driving waveform signal having a sloping region the slope of which is set according to the cycle signal. A D/A converter receives the driving waveform signal, and converts the driving waveform signal thus received into an analog voltage. A driving unit supplies a driving voltage to the motor according to the analog voltage thus received.

10 Claims, 4 Drawing Sheets

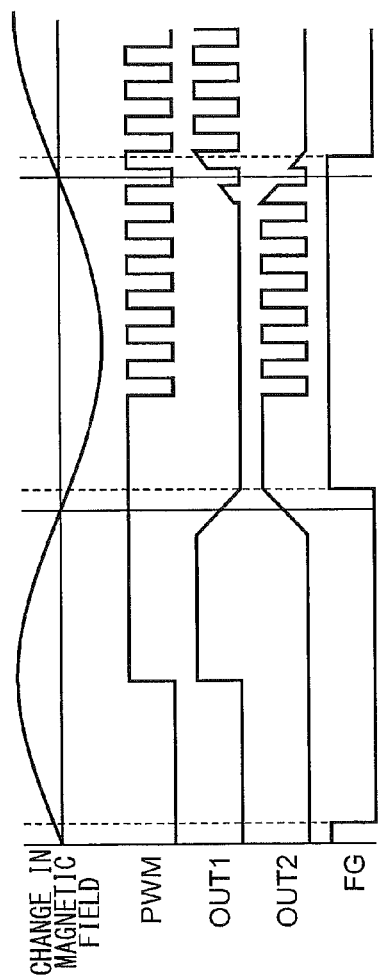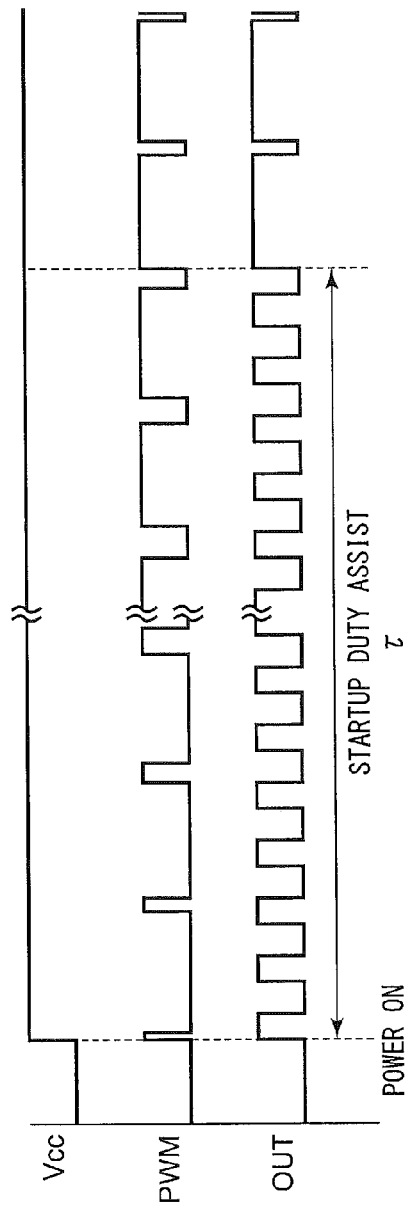

CIRCUIT AND METHOD FOR DRIVING MOTOR

BACKGROUND OF THE INVENTION

1. Field of the Invention

The present invention relates to a driving technique for a motor.

2. Description of the Related Art

As a cooling fan motor, a spindle motor for rotating an optical or a magnetic disk, or a capstan motor employed in a tape recorder apparatus, a brushless DC motor is employed. A typical brushless motor includes a rotor having a permanent magnet and a stator having a coil. With such a brushless DC motor, the electric current to be supplied to the coil is controlled so as to excite the coil, thereby rotationally driving the brushless DC motor.

Techniques for detecting the rotational position of the rotor of a brushless DC motor are known, examples of which include techniques using Hall effect sensors or techniques for a sensorless driving operation using back electromotive force which occurs when phase transmission occurs. The Hall effect sensors generate a pair of Hall signals (which will be collectively referred to simply as the "Hall signal") that change in a complementary manner according to the position of the rotor of the motor.

A driving circuit for a motor switches the polarity of the driving voltage to be supplied to the coil, based upon the timing at which the Hall signal or the back electromotive force is detected. In a case in which a Hall signal having a sinusoidal wave waveform or a trapezoidal wave waveform is obtained according to changes in the polarity of the rotor, the driving circuit for the motor gradually changes the driving voltage and the polarity to be applied to the coil, using the change in the voltage in the Hall signal before and after the switching timing, thereby reducing the motor driving noise. Such an arrangement is also referred to as a "soft switch".

With regard to such a motor which is capable of detecting the rotor position using Hall effect sensors, a technique is known in which Hall effect sensors are integrated on a single circuit on which a motor driving IC is mounted, instead of employing Hall effect sensors in the form of external components, thereby reducing the number of components mounted on a substrate. However, where such Hall effect sensor components are integrated on the driving circuit using the silicon process, highly magnetically sensitive material cannot be employed, unlike an arrangement employing Hall effect sensors in the form of external components. This leads to a problem of reduced magnetic sensitivity. In order to compensate for this problem, the signal to be used is amplified on the integrated circuit. However, such an arrangement also amplifies the offset component of the signal output in a complementary manner. If signal processing is performed to cancel out the offset component, the difference in the magnetic field before and after the switching timing, which is to be detected by the Hall effect sensor, cannot be detected, and thus the soft switching technique using this difference cannot be used in such an arrangement. Similarly, in a case in which a sensorless technique using back electromotive force is employed, only the timing at which the back electromotive force is generated is detected, and thus, like the aforementioned arrangement employing Hall effect sensors, the soft switching technique according to the change in the magnetic field cannot be used in such an arrangement.

SUMMARY OF THE INVENTION

The present invention has been made in view of such a situation. Accordingly, it is an exemplary purpose of an embodiment according to the present invention to provide a technique for performing a soft switching operation according to the rotational speed of a motor even in a case in which only the phase transition timing can be used as information to detect the position of a rotor of the motor.

An embodiment of the present invention relates to a motor driving circuit. The motor driving circuit comprises: a cycle counter configured to generate a cycle signal which indicates, in the form of a digital value, the cycle of a Hall signal that indicates the position of a rotor of a motor to be driven; an up/down counter configured to repeatedly alternate between counting "up" and counting "down" upon detecting phase transitions that occur in the Hall signal, and to generate a driving waveform signal in the form of a digital signal having a sloping region the slope of which is set according to the cycle signal; a D/A converter configured to receive the driving waveform signal, and to convert the driving waveform signal thus received into an analog voltage; and a driving unit configured to supply a driving voltage that corresponds to the analog voltage to the motor.

Such an arrangement enables the motor to perform a soft-switching operation according to the rotational speed of the motor even in a situation in which the Hall signal has no effective sloping region.

Another embodiment of the present invention relates to an electronic device. The electronic device includes a spindle motor configured to rotate a disk, and the above-described motor driving circuit configured to drive the spindle motor. Alternatively, an electronic device according to yet another embodiment comprises a fan motor and the above-described driving circuit configured to drive the fan motor. Also, an electronic device according to yet another embodiment comprises a capstan motor and the above-described driving circuit configured to drive the capstan motor.

It is to be noted that any arbitrary combination or rearrangement of the above-described structural components and so forth is effective as and encompassed by the present embodiments.

Moreover, this summary of the invention does not necessarily describe all necessary features so that the invention may also be a sub-combination of these described features.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which:

FIG. 4A is a waveform diagram which shows the PWM control operation, and FIG. 4B is a waveform diagram which shows a startup duty assist function.

DETAILED DESCRIPTION OF THE INVENTION

Figure 1:
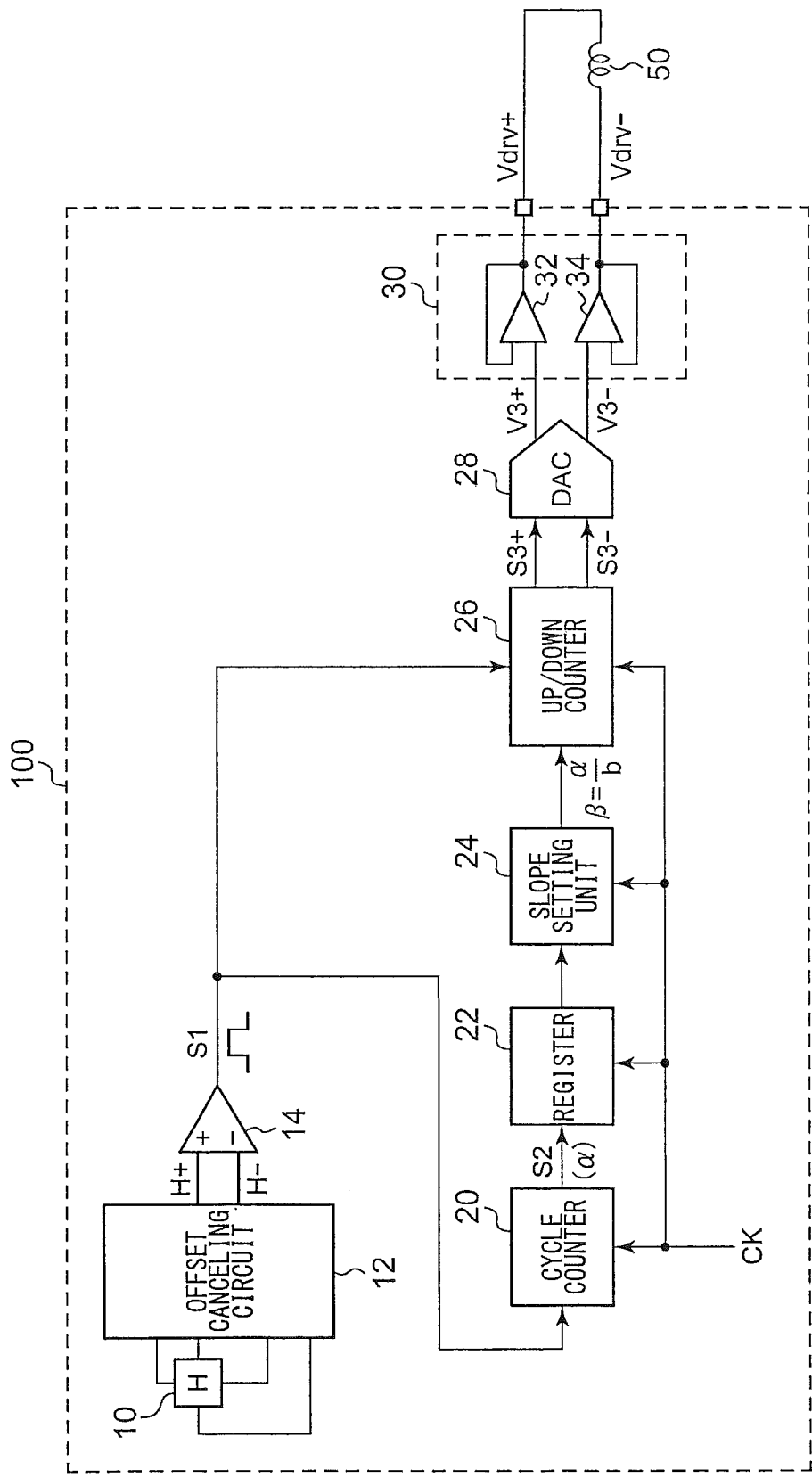
FIG. 1 is a circuit diagram which shows a configuration of a motor driving circuit according to an embodiment.

The invention will now be described based on preferred embodiments which do not intend to limit the scope of the present invention but exemplify the invention. All of the features and the combinations thereof described in the embodiment are not necessarily essential to the invention.

In the present specification, the state represented by the phrase "the member A is connected to the member B"

includes a state in which the member A is indirectly connected to the member B via another member that does not affect the electric connection therebetween, in addition to a state in which the member A is physically and directly connected to the member B. Similarly, the state represented by the phrase "the member C is provided between the member A and the member B" includes a state in which the member A is indirectly connected to the member C, or the member B is indirectly connected to the member C via another member that does not affect the electric connection therebetween, in addition to a state in which the member A is directly connected to the member C, or the member B is directly connected to the member C.

In the present specification, the reference numerals that denote electric signals such as voltage signals, current signals, etc., also represent the voltage value, the current value, etc., as necessary.

FIG. 1 is a circuit diagram which shows a configuration of a motor driving circuit 100 according to an embodiment. The motor driving circuit 100 supplies driving voltages Vdrv+ and Vdrv− to both terminals of a single-phase brushless DC motor (which will be simply referred to as the "motor" hereafter) 50, thereby supplying a coil current.

The motor driving circuit 100 includes a Hall effect sensor 10, an offset canceling circuit 12, a comparator 14, a cycle counter 20, a register 22, a slope setting unit 24, an up/down counter 26, a D/A converter 28, and a driving unit 30, which are monolithically integrated on a single semiconductor substrate. The Hall effect sensor 10, the comparator 14, and the D/A converter 28 are configured as an analog circuit, and the cycle counter 20, the register 22, the slope setting unit 24, and the up/down counter 26 are configured as a digital circuit.

The Hall effect sensor 10, the offset canceling circuit 12, and the comparator 14 can be configured using known techniques, and accordingly only simple description thereof will be made. The Hall effect sensor 10 includes four terminals that are bridge connected via respective resistor elements (not shown) such that each terminal is positioned at a vertex of the circuit. The resistance value of each resistor element changes according to the magnetic field received from the motor 50, i.e., according to the position of the rotor. In some cases, the Hall signal acquired by the Hall effect sensor 10 contains an offset component that occurs due to irregularities in the four resistors. The offset canceling circuit 12 acquires a signal while virtually rotating the four terminals of the Hall effect sensor so as to sequentially shift the positions of the Hall effect sensors 10, thereby canceling out the offset component of the Hall signal. The Hall signals H+ and H− obtained by the offset canceling circuit 12 are weak signals. Accordingly, the Hall signals H+ and H− thus obtained are compared and amplified by the Hall amplifier (comparator) 14.

The Hall signal thus amplified by the comparator 14 is a rectangular pulse which repeatedly alternates between the high level and the low level. The Hall signal thus amplified by the comparator 14 will be referred to as the "rotational speed pulse signal "S1" hereafter.

The cycle counter 20 receives the rotational speed pulse signal (Hall signal) S1 which indicates the position of the rotor of the motor 50, and generates a cycle signal S2 which indicates the period t in the form of a digital value. For example, the cycle counter 20 receives, as an input signal, a reference clock CK having a frequency sufficiently higher than that of the rotational speed pulse signal S1. The cycle counter 20 counts the interval between the positive edges and the negative edge of the rotational speed pulse signal S1, and generates a cycle signal S2. With the period of the reference clock CK as Tp, the value $\alpha$ of the cycle signal S2 is represented by the Expression $\alpha = t/Tp$.

It should be noted that any arrangement may be made as long as the cycle counter 20 counts the rotational period of the motor. Thus, the cycle counter 20 may count the interval between the positive edge and the adjacent positive edge. Also, the cycle counter 20 may count the interval between the negative edge and the adjacent negative edge.

The cycle signal S2 which indicates the period t (cycle) of the rotational speed pulse signal S1 is stored in the register 22 provided as a downstream component.

The up/down counter 26 repeatedly alternates between counting "up" and counting "down" upon detecting phase transitions in the Hall signals H+ and H−, i.e. upon detecting edges in the rotational speed pulse signal S1, so as to generate a driving waveform signal pair S3+ and S3− having sloping regions (the signals S+ and S− will be collectively referred to simply as the "driving waveform signal" hereafter). The driving waveform signals S3+ and S3− are provided in the form of a digital signal, and have trapezoidal waveforms with opposing phases (in a complementary manner). Description will be made below regarding an arrangement in which the driving waveform signals S3 have (n+1) signal levels (n is an integer). With the bottom value of the trapezoidal waveform as 0, and the peak value thereof as n, when a signal level n=15 is to be obtained, the up/down counter 26 is configured as a 4-bit counter. It should be noted that an arrangement may be made employing a signal level n=7 (3-bit counter) or n=31 (5-bit counter).

The up/down counter 26 may include two up/down counters which perform the count "up" operation and the count "down" operation in a complementary manner. With such an arrangement, the output of one up/down counter may be used as the driving waveform signal S3+, and the output of the other up/down counter may be used as the driving waveform signal S3−. Also, the up/down counter 26 may include a single up/down counter which generates one driving waveform signal S3+. With such an arrangement, the other driving waveform signal S3− may be generated by subtracting the output data of the up/down counter from a predetermined constant value n.

The slope setting unit (signal processing unit) sets the slope of each sloping region of the driving waveform signal S3 according to the value $\alpha$ of the cycle signal S2 stored in the register 22. The slope of the sloping region becomes shallower as the duration of the period t of the rotational speed pulse signal S1, which is indicated by the cycle signal S2, becomes longer (as the rotational speed of the motor decreases), and the slope of the sloping region increases as the period t becomes shorter.

Given a first constant a, setting may be made such that the duration of the sloping region of the driving waveform signal S3 becomes t/a. The value of the constant a should be optimized according to the properties of the motor 50. For example, the value of the constant a should be set to a value in a range from 20 to 30.

For example, by dividing the digital value $\alpha$, which indicates the period t, by a second constant b (=a×n) obtained by multiplying the first constant a by n, the slope setting unit 24 calculates the quotient $\beta$.

$$\beta = \alpha/b$$

The up/down counter 26 counts "up" or "down" for every $\beta$ pulses of the reference clock CK. In this case, the time period of one step of the up/down counter 26 is set to t/b.

The D/A converter 28 receives the driving waveform signals S3+ and S3−, and converts the driving waveform signals S3+ and S3− thus received into analog voltages. The driving unit 30 supplies driving voltages Vdrv+ and Vdrv− that correspond to the analog voltages V3+ and V3− thus converted to both terminals of the motor 50. For example, the driving unit 30 includes a first amplifier and a second amplifier 34 which respectively perform inverting and non-inverting amplification of the analog voltages V3+ and V3−.

Figure 2A:
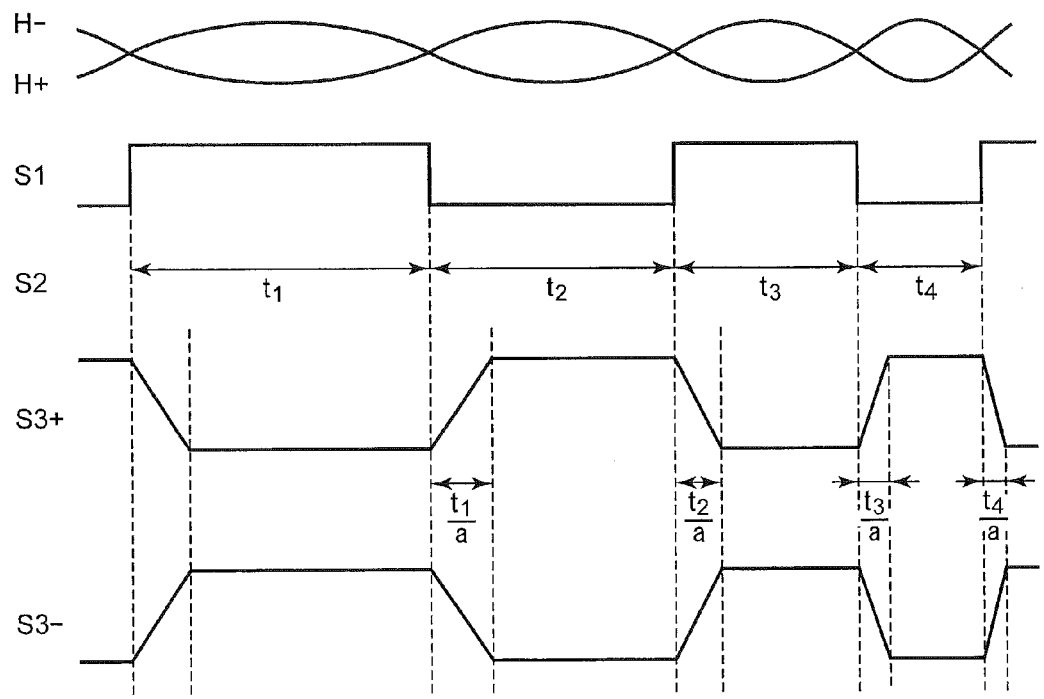
FIGS. 2A and 2B are time charts which show the operation of the motor driving circuit shown in FIG. 1.
Figure 2B:
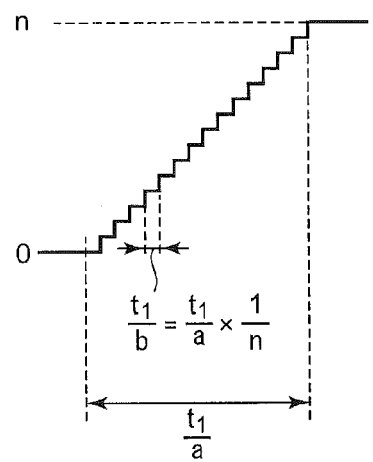

The above is the configuration of the motor driving circuit 100. Next, description will be made regarding the operation thereof. FIGS. 2A and 2B are time charts which show the operation of the motor driving circuit 100 shown in FIG. 1.

With reference to FIG. 2A, the offset canceling circuit 12 generates the Hall signals H+ and H− synchronously with the rotation of the motor 50. The rotational speed pulse signal S1 is generated such that it is high level when H+>H−, and such that it is low level when H+<H−, based upon the comparison results obtained by making a comparison between the Hall signals H+ and H−.

The cycle counter 20 measures the pulse width (half of the period t) of the rotational speed pulse signal S1, and generates the cycle signal S2, which indicates the period t, in the form of a digital value. The slope setting unit 24 sets the duration of the sloping region of the driving waveform to be supplied to the motor 50 according to the value of the cycle signal S2. As described above, the duration of the sloping region is represented by t/a.

FIG. 2B is an enlarged view of the sloping region of the driving waveform signal S3. The slope setting unit 24 sets the duration (step length) of one step to t/b. FIG. 2B shows the driving waveform signal S3 with n=16. In this case, the duration of one step is represented by the Expression t/b=t/(n×a) =t/(15×a).

The up/down counter 26 repeatedly alternates between the count "up" operation or the count "down" operation in increments of the step length set by the slope setting unit 24, thereby generating the trapezoidal waveform driving waveform signals S3+ and S3−. The D/A converter 28 converts the driving waveform signals S3+ and S3− into the analog voltages V3+ and V3−, and the driving unit 30 supplies the analog voltages V3+ and V3− thus converted to both terminals of the motor 50.

With the motor driving circuit 100 shown in FIG. 1, the driving polarity can be switched at a suitable timing according to the rotation of the motor 50. Furthermore, such an arrangement is capable of applying a sloping region to the waveform of the driving voltage to be applied to the motor 50 when the driving polarity is switched, thereby providing a suitable soft switching operation. Moreover, the duration of the sloping region corresponds to the rotational speed of the motor 50. Thus, such an arrangement suppresses noise generation, and reduces power consumption.

Furthermore, by optimizing the aforementioned constant a and the number of signal levels n of the cycle signal S2, such an arrangement reduces noise and power consumption as compared with conventional arrangements.

Figure 3:
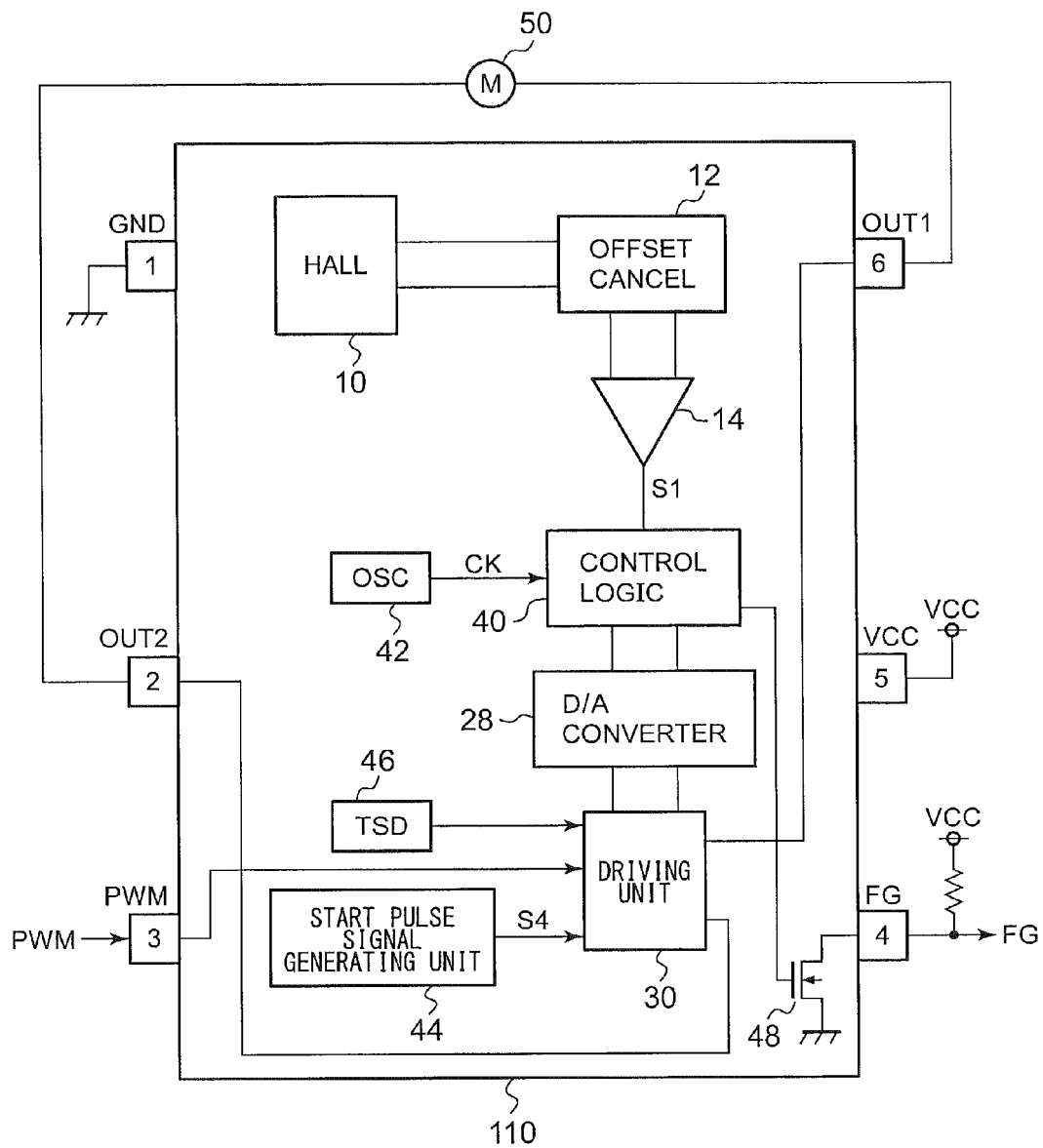
FIG. 3 is a block diagram which shows a configuration of a motor driving IC according to an embodiment.

Next, description will be made regarding a motor driving IC 110 that corresponds to the above-described motor driving circuit 100. FIG. 3 is a block diagram which shows a configuration of the motor driving IC 110 according to an embodiment. The GND terminal provided as a first pin is grounded. The motor 50 is connected to output terminals OUT1 (sixth pin) and OUT2 (second pin).

A control logic unit 40 corresponds to the cycle counter 20, the register 22, the slope setting unit 24, and the up/down counter 26 shown in FIG. 1. An oscillator 42 generates a clock signal CK, and supplies the clock signal CK thus generated to the control logic unit 40. The control logic unit 40 generates an FG (Frequency Generator) signal having a level that corresponds to the rotational speed pulse signal S1. The FG signal is output via an output transistor 48 in an open drain manner. An FG terminal (fourth pin) is pulled up via a resistor R1 provided in the form of an external component.

A pulse width modulation (PWM) signal, which has been pulse-width modulated, is input to a PWM terminal (third pin) from an external circuit. The motor driving IC 110 has a function for controlling the rotational speed of the motor 50 according to the duty ratio of the PWM signal. FIG. 4A is a time chart which shows the PWM control operation.

The driving unit 30 receives the PWM signal. During an interval in which the PWM signal is at a first level (e.g., high level), the driving unit 30 applies the driving voltage Vdrv+ and Vdrv− to both terminals of the coil of the motor 50 according to the analog voltages V3+ and V3− received from the D/A converter 28. It should be noted that, in a case in which the PWM terminal is open (high impedance), the signal received via the PWM terminal is treated as being the same as a high level signal.

Furthermore, during an interval in which the PWM signal is at a second level (e.g., low level), the driving unit 30 sets the difference in the driving voltages to be supplied to both terminals of the coil of the motor 50, i.e., (Vdrv+)−(Vdrv−), to zero. Specifically, the driving unit lowers the higher of the driving voltages (Vdrv+) and (Vdrv−) such that it matches the lower.

Such an arrangement adjusts the temporal average value of the current that flows through the motor 50 according to the duty ratio of the PWM signal, thereby enabling the rotational speed (torque) of the motor 50 to be controlled.

When the PWM control operation is performed when the motor 50 is in a stationary state, in a case in which a PWM signal with a low duty ratio is input, in some cases, the torque generated by the motor 50 is insufficient to overcome the static friction, leading to a problem in that the motor 50 does not starts to rotate. Alternatively, in some cases, this leads to a problem in which the motor 50 requires a very long time to reach a desired rotational speed. In order to solve this problem, the motor driving IC 110 has a startup duty assist function. FIG. 4B is a waveform diagram which shows the startup duty assist function.

Specifically, a start pulse signal generating unit 44 generates a start pulse signal S4 having a fixed duty ratio. For example, the fixed duty ratio is set to 50%, and the frequency thereof is set to 33 kHz.

When the power supply is turned on, or when the state returns from the standby state, during a period τSTART, the driving unit 30 PWM drives the motor 50 according to the duty ratio of the start pulse signal S4, instead of the duty ratio of the PWM signal. The predetermined period τSTART is defined to be a period from the start of the driving operation until detection of the motor 50 startup. An upper limit is set for the period τSTART. For example, the upper limit is set to 250 ms. An arrangement may be made in which, in a case in which the period τSTART exceeds the upper limit, an error signal is generated, and the driving unit 30 tries a restart operation.

The function of detecting the motor 50 startup can be realized by monitoring the rotational speed pulse signal S1 or the FG signal. That is to say, when the motor 50 is in the stationary state, the rotational speed pulse signal S1 and the FG signal remain at a constant level. When the motor 50 starts to rotate, pulses are generated in these signals. For example, upon counting a predetermined number of pulses in the signal, the driving operation is switched from the PWM driving operation using the start pulse signal S4 to the PWM driving operation using the PWM signal.

The startup duty assist function enables the motor 50 in the stationary state to start to rotate in a sure manner. Alternatively, such an arrangement enables the period of time required for the motor 50 in the stationary state to reach a desired rotational speed to be reduced.

A thermal shutdown circuit 46 detects the temperature of the motor driving IC 110. In a case in which the temperature exceeds a predetermined threshold value, the thermal shutdown circuit 46 shuts down the motor driving IC 110, thereby protecting the circuit from heat damage.

Description has been made regarding the present invention with reference to the embodiment. The above-described embodiment has been described for exemplary purposes only, and is by no means intended to be interpreted restrictively. Rather, it can be readily conceived by those skilled in this art that various modifications may be made by making various combinations of the aforementioned components or processes, which are also encompassed in the technical scope of the present invention. Description will be made below regarding such modifications.

[Modification 1]

Also, the slope setting unit 24 may set the slope of the sloping region by performing statistical processing on a predetermined number of values α of the cycle signal S2. Examples of the statistical processing include simple averaging, weighted averaging, etc. By setting the slope based upon the period t averaged over a predetermined number of measurements, such an arrangement provides a stable rotational operation of the motor 50.

[Modification 2]

Description has been made in the above-described embodiment regarding an arrangement in which the duration of each sloping region of the driving waveform is set in proportion to the rotational period of the motor. However, the present invention is not restricted to such an arrangement. For example, the slope setting unit 24 may include a table which defines the relation between the cycle period and the duration of the sloping region, and may operate with reference to the table, thereby providing the same processing. With such an arrangement including such a table, the duration of the sloping region can be adjusted more finely. Thus, such an arrangement provides advantages from the perspective of noise and power consumption.

[Modification 3]

Description has been made regarding an arrangement in which the Hall effect sensor 10, the offset canceling circuit 12, and the comparator 14 are monolithically integrated together with other circuit blocks. Also, a part of the Hall effect sensor 10, the offset canceling circuit 12, and the comparator 14 may be provided in the form of external components.

The logic level settings such as the high level and the low level have been described in the embodiments for exemplary purpose only. Various modifications can be conceived for the configuration of such a logic circuit block, which are encompassed within the scope of the present invention.

While the preferred embodiments of the present invention have been described using specific terms, such description is for illustrative purposes only, and it is to be understood that changes and variations may be made without departing from the spirit or scope of the appended claims.

What is claimed is:

1. A motor driving circuit comprising:
    a cycle counter configured to generate a cycle signal which indicates, in the form of a digital value, the cycle of a Hall signal that indicates the position of a rotor of a motor to be driven;
    an up/down counter configured to repeatedly alternate between counting "up" and counting "down" between a bottom value and a peak value,
        wherein the counting up and the counting down respectively starts when detecting phase transitions that occur in the Hall signal,
        an output of the up/down counter is a digital value and has a trapezoidal waveform including a first sloping region corresponding to the counting up and a second sloping region corresponding to the counting down,
        and the slope of the first and the second sloping regions are set according to the cycle signal;
    a D/A converter configured to receive the output of the up/down counter, and to convert the output of the up/down counter into an analog voltage; and
    a driving unit configured to supply a driving voltage that corresponds to the analog voltage to the motor.

2. A motor driving circuit according to claim 1, wherein, with the period indicated by the cycle signal as t, and with a predetermined first constant as a, the duration of each of the first and the second sloping regions is set to t/a.

3. A motor driving circuit according to claim 2, wherein, with a predetermined second constant obtained by multiplying the first constant a by n (n is an integer of 2 or more) as b, the time period of one step of the up/down counter is set to t/b.

4. A motor driving circuit according to claim 1, further comprising a signal processing unit configured to perform statistical processing on a predetermined number of cycle signals,
    wherein the up/down counter sets the slope of the first and second sloping regions according to the value obtained as a result of the statistical processing.

5. A motor driving circuit according to claim 1, further comprising:
    a Hall effect sensor configured to generate a Hall signal which indicates the position of the rotor of the motor; and
    an amplifier configured to amplify the Hall signal, and to generate a pulse signal,
    wherein the cycle counter counts the period of the pulse signal, and is integrated on a single semiconductor substrate.

6. A motor driving circuit according to claim 1, further comprising:
    a Hall effect sensor configured to generate a Hall signal;
    an offset canceling circuit configured to cancel out the offset component of the Hall signal, and to output the Hall signal thus processed to the cycle counter; and
    a pulse modulation terminal via which a pulse modulation signal is input from an external circuit,
    wherein, when the pulse modulation signal is at a first level, the driving unit applies a driving voltage that corresponds to the analog voltage to both terminals of the coil of the motor, and when the pulse modulation signal is at a second level, the driving unit sets the driving voltage to be applied to both terminal of the coil to zero, thereby providing a configuration which enables the rotational speed of the motor to be controlled according to the duty ratio of the pulse modulation signal.

7. A motor driving circuit according to claim 6, further comprising a start pulse signal generating unit configured to generate a start pulse signal having a fixed duty ratio,
    wherein, when a power supply is turned on, or when the state returns from a standby state, the driving unit drives the motor according to the duty ratio of the start pulse signal, instead of the duty ratio of the pulse modulation signal.

8. A motor driving method comprising:
generating a cycle signal which indicates, in the form of a digital value, the cycle of a Hall signal that indicates the position of a rotor of a motor to be driven;
an up/down counter repeatedly alternating between counting "up" and counting "down" between a bottom value and a peak value, the counting up and the counting down start when detecting phase transitions that occur in the Hall signal,
- wherein an output of the up/down counter is a digital value and has a trapezoidal waveform including a first sloping region corresponding to the counting up and a second sloping region corresponding to the counting down;

setting, according to the cycle signal, the slope of the first and the second sloping regions;
converting the output of the up/down counter into an analog voltage; and
supplying a driving voltage that corresponds to the analog voltage to the motor.

9. A motor driving method according to claim 8, further comprising processing wherein, with the digital value of the cyclic signal as t, and with a predetermined first constant as a, the duration of each of the first and the second sloping regions is set to t/a.

10. A motor driving method according to claim 8, further comprising statistical processing on a predetermined number of cycle signals,
- wherein the slope of the first and the second sloping regions is set according to the value obtained as a result of the statistical processing.

* * * * *